United States Patent
Schuttenberg et al.

(10) Patent No.: US 9,645,936 B1
(45) Date of Patent: May 9, 2017

(54) SYSTEM AND METHOD FOR INFORMING HARDWARE TO LIMIT WRITING IN A MEMORY HIERARCHY

(71) Applicant: MARVELL INTERNATIONAL LTD., Hamilton (BM)

(72) Inventors: Kim Schuttenberg, Gilbert, AZ (US); Richard Bryant, Chandler, AZ (US)

(73) Assignee: MARVELL INTERNATIONAL LTD. (BM)

( * ) Notice: Subject to any disclaimer, the term of this patent is extended or adjusted under 35 U.S.C. 154(b) by 68 days.

(21) Appl. No.: 14/669,350

(22) Filed: Mar. 26, 2015

Related U.S. Application Data (60) Provisional application No. 61/970,676, filed on Mar. 26, 2014.

(51) Int. Cl.
  *G06F 12/00* (2006.01)
  *G06F 12/0875* (2016.01)
  *G06F 12/0811* (2016.01)
  *G06F 13/00* (2006.01)
  *G06F 13/28* (2006.01)

(52) U.S. Cl.
  CPC ...... *G06F 12/0875* (2013.01); *G06F 12/0811* (2013.01); *G06F 2212/283* (2013.01); *G06F 2212/452* (2013.01)

(58) Field of Classification Search
  CPC ............. G06F 12/0875; G06F 12/0811; G06F 2212/283; G06F 2212/452
  See application file for complete search history.

(56) References Cited

U.S. PATENT DOCUMENTS

| | | | | |
|---|---|---|---|---|
| 5,418,916 A * | 5/1995 | Hall | ................... | G06F 12/0811 711/E12.024 |
| 5,440,749 A * | 8/1995 | Moore | .................. | G06F 7/5272 711/E12.02 |
| 2009/0106495 A1* | 4/2009 | Chou | ..................... | G06F 9/3004 711/130 |
| 2010/0161904 A1* | 6/2010 | Cypher | ............... | G06F 12/0811 711/122 |
| 2012/0268471 A1* | 10/2012 | Khalvati | ................. | G06T 1/60 345/522 |
| 2014/0325159 A1* | 10/2014 | Meredith | ............ | G06F 12/0862 711/135 |

* cited by examiner

Primary Examiner — Mark Giardino, Jr.

(57) ABSTRACT

Systems, methods, and other embodiments associated with providing limited writing in a memory hierarchy are described. According to one embodiment, an apparatus includes a plurality of memory devices sequentially configured in a memory hierarchy. The apparatus also includes a first logic configured to execute a first command to initiate a sequence of write operations to write data to the plurality of memory devices in the memory hierarchy via propagation of the data sequentially through the memory hierarchy. The apparatus further includes a second logic configured to execute a second command to initiate an interruption of the sequence of write operations by indicating to at least one memory device of the plurality of memory devices to terminate the propagation of the data through the memory hierarchy prior to completing the propagation.

20 Claims, 6 Drawing Sheets

FIG. 1

Subroutine:
> storetransient (R0-R8)
> *internal processing commands*
> loadlast (R0-R8)
> return

FIG. 2A

Subroutine:
> pushtransient (R0-R8)
> *internal processing commands*
> poplast (R0-R8)
> return

SYSTEM AND METHOD FOR INFORMING HARDWARE TO LIMIT WRITING IN A MEMORY HIERARCHY

CROSS REFERENCE TO RELATED APPLICATIONS

This patent disclosure claims the benefit of U.S. Provisional Application Ser. No. 61/970,676 filed on Mar. 26, 2014, which is hereby wholly incorporated by reference.

BACKGROUND

Many programming languages and operating systems have dynamically allocated memory. Dynamically allocated memory is usually divided between a "heap" of freely allocated memory and a "stack" that is allocated and deallocated in a last-in-first-out (LIFO) manner. What both of these commonly used paradigms of dynamic memory have in common is that there is a time when the software author or the compiler can "know" that the value of memory that it considers "deallocated" no longer matters. The operating system usually tracks this on a "page" granularity (usually several thousand contiguous memory locations) and can re-use memory for another program if a full page becomes unneeded in the first program.

It is common for a software function to push data onto the stack to save some state, and then pop the data off of the stack. However, after the data is popped off of the stack, the memory locations that were used to implement the stack still contain data that the software may no longer need. The data has "gone out of scope" or has "passed its lifetime".

In a modern microprocessor, for example, it is likely that the "writes" to memory that the push operation causes have not fully completed. High performance processors execute many operations in parallel at various stages of execution and can bypass data between processors even if the source of the data has not completed. In the current state of the art, the microprocessor would not be aware that the values represented by the writes are no longer needed. Therefore, the microprocessor would spend resources completing the execution of the writes (e.g., by draining write buffers, doing coherency operations, etc.), which serve no value to the software it is executing.

SUMMARY

In general, in one aspect this specification discloses an apparatus. In one embodiment, the apparatus includes a plurality of memory devices sequentially configured in a memory hierarchy. The apparatus also includes a first logic configured to execute a first command. The first command initiates a sequence of write operations to write data to the plurality of memory devices in the memory hierarchy via propagation of the data sequentially through the memory hierarchy. The apparatus further includes a second logic configured to execute a second command. The second command initiates an interruption of the sequence of write operations by indicating to at least one memory device of the plurality of memory devices to terminate the propagation of the data through the memory hierarchy prior to completing the propagation.

In general, in another aspect, this specification discloses a method. In one embodiment, the method is executed by a processing device having hardware configured to execute software commands. The method includes executing a first command to initiate a sequence of write operations. The sequence of write operations is configured to write data to a plurality of memory devices in a memory hierarchy via propagation of the data sequentially through the memory hierarchy. The method also includes executing a second command to initiate an interruption of the sequence of write operations. Interruption of the sequence of write operations is accomplished by indicating to at least one memory device of the plurality of memory devices to terminate the propagation of the data through the memory hierarchy prior to completing the propagation.

In general, in another aspect, this specification discloses an integrated circuit device. In one embodiment, the integrated circuit device includes a plurality of memory devices sequentially configured in a memory hierarchy. The integrated circuit device also includes execution logic configured to execute a store command to initiate a sequence of write operations. The sequence of write operations is configured to write data to the plurality of memory devices via propagation of the data sequentially through the memory hierarchy. The integrated circuit device further includes load logic configured to execute a load command. The load command is configured to load the data into the execution logic from one memory device of the plurality of memory devices. The load command is further configured to initiate an interruption of the sequence of write operations by indicating to the one memory device to terminate the propagation of the data through the memory hierarchy prior to completing the propagation.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Described herein are examples of systems, apparatus, methods, and other embodiments associated with providing a capability to limit writing operations in a memory hierarchy. Today's high speed processing devices are often able to complete certain processing operations that use certain data before that data can be propagated through a memory hierarchy to complete a store operation. As a result, the data may no longer be needed by the processing device. However, the process of propagating the data through the memory hierarchy to complete the store is continued.

By adding commands (e.g., storetransient and/or loadlast commands, pushtransient and/or poplast commands, notice and/or interrupt commands) to an instruction set architecture (ISA) that limit writing of data in a memory hierarchy by a processing device, more efficient use of the memory hierarchy and the resources of the processing device may be accomplished. For example, less energy may be used in a system that limits writing operations in a memory hierarchy.

In one embodiment, a plurality of memory devices are sequentially configured in a memory hierarchy of a processing device that executes software instructions. The processing device is configured to execute a command to initiate a sequence of write operations to write data to the plurality of memory devices in the memory hierarchy. The sequence of write operations propagates the data sequentially through the memory hierarchy in an attempt to complete a store operation to store data.

The processing device is also configured to execute a command to initiate an interruption of the sequence of write operations. The interruption indicates to at least one memory device of the plurality of memory devices to terminate the propagation of the data through the memory hierarchy prior to completing the propagation. This is because, for example, the data being written in the memory hierarchy is no longer needed by the software instructions being executed by the processing device. In this manner, the processing device is allowed to abandon further writing of the data in the memory hierarchy.

In one embodiment, the processing device may be configured to execute a command that indicates to a memory device of the plurality of memory devices to defer the propagation of the data through the memory hierarchy (i.e., wait before propagating the data further in the memory hierarchy). For example, the data being written in the memory hierarchy may soon no longer be needed by the software instructions being executed by the processing device. In this manner, the processing device is allowed to defer completion of writing of the data in the memory hierarchy for a time, in case a command is executed that indicates to terminate the propagation of the data through the memory hierarchy.

The terms "written to", "drained to", "loaded to", "stored to" and like variations thereof, as used herein, refer to the placement of data in memory and such terms may be used interchangeably herein.

The term "memory hierarchy", as used herein, refers to hardware levels of memory in a computing device that a same data may be written to, via sequential propagation, during a processing operation of the computing device. For example, when a computing device executes a subroutine, data may first be stored in a store buffer within a processor of the computing device and eventually be propagated to (e.g., drained to) a cache memory within the processor. The data may then eventually be propagated from the cache memory to a random access memory device that is external to the processor. Therefore, the store buffer, the cache memory, and the random access memory device each define a different level in a memory hierarchy.

The term "defer", as used herein, refers to waiting for an amount of time (e.g., a number of processing clock cycles) before continuing with the propagating of data through a memory hierarchy. The terms "terminate" and "abandon", as used herein, refer to permanently stopping or discontinuing the propagating of data through a memory hierarchy.

Figure 1:
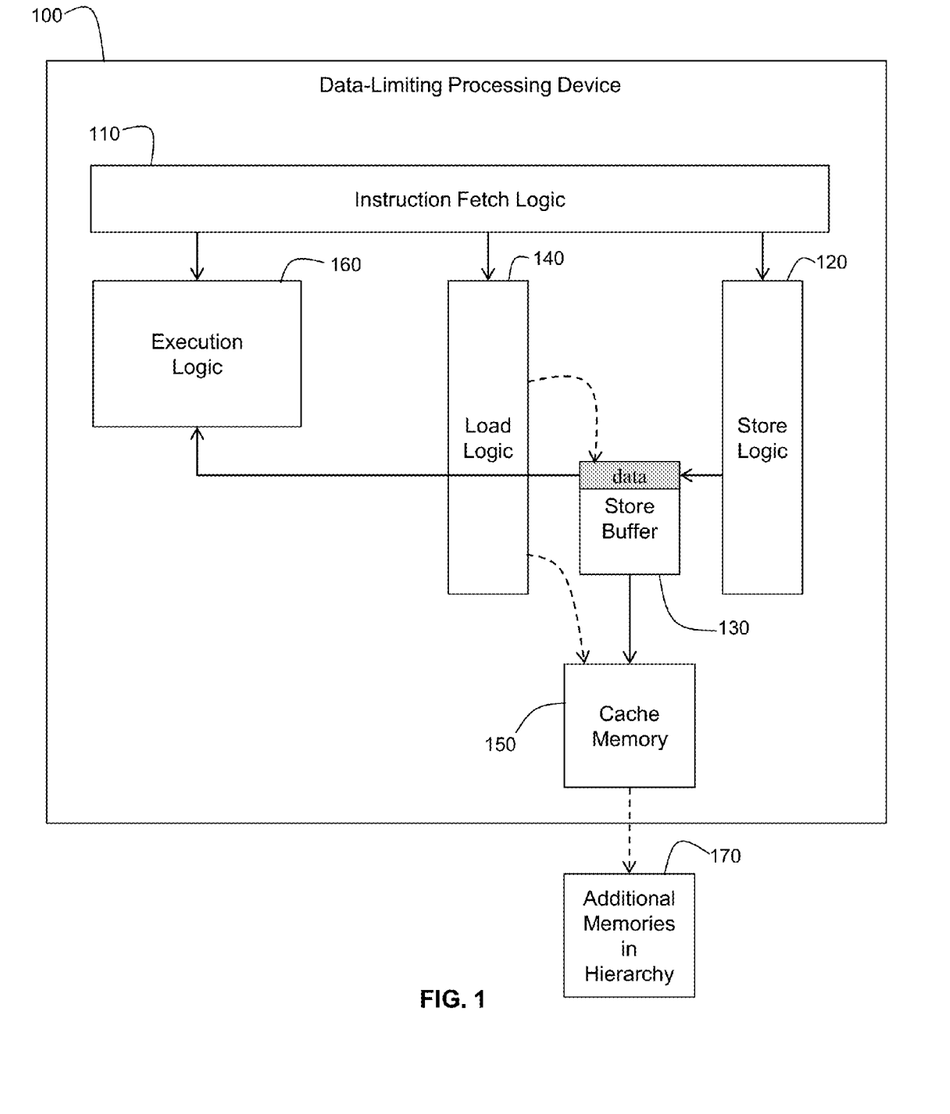
FIG. 1 illustrates an example embodiment of a processing device configured to limit the writing of data in a memory hierarchy.

FIG. 1 illustrates an example embodiment of a data-limiting processing device 100 configured to limit the writing of data in a memory hierarchy. The processing device 100 includes instruction fetch logic 110, store logic 120, store buffer 130, load logic 140, cache memory 150, and execution logic 160. The processing device 100 may be in the form of, for example, a microprocessor, in accordance with one embodiment. In one embodiment, the store logic 120 and the load logic 140 are configured as instruction pipelines.

The store buffer 130 and the cache memory 150 are a part of a memory hierarchy of hardware memory devices, in accordance with one embodiment. In one embodiment, the memory hierarchy is organized as a sequence of a plurality of memory devices. The memory hierarchy may include additional memory devices 170 in the sequence, where the additional memory devices 170 are external to the data-limiting processing device 100 as shown in FIG. 1.

In one embodiment, the processing device 100 is implemented on a chip (i.e., a system-on-chip or SOC configuration) including one or more integrated circuits configured to perform one or more of the functions described herein. In another embodiment, the logics of the processing device 100 may be part of an executable algorithm configured to perform the functions of the logics where the algorithm is stored in a non-transitory medium.

Referring to FIG. 1, the instruction fetch logic 110 is operably connected to the store logic 120, the load logic 140, and the execution logic 160. The instruction fetch logic is configured to fetch software instructions from a program accessible by the processing device 100 and provide the software instructions to the store logic 120, the load logic 140, and the execution logic 160 as warranted.

Figure 2A:
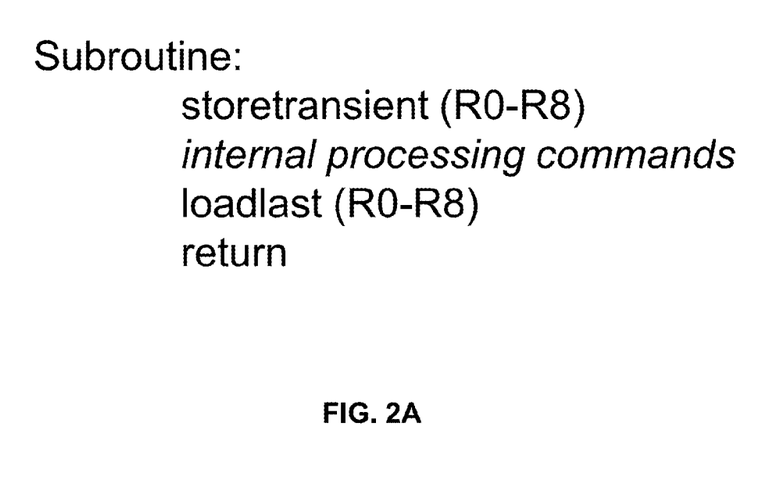
FIGS. 2A and 2B illustrate example embodiments of subroutine structures that may be executed by the processing device of FIG. 1.
Figure 2B:
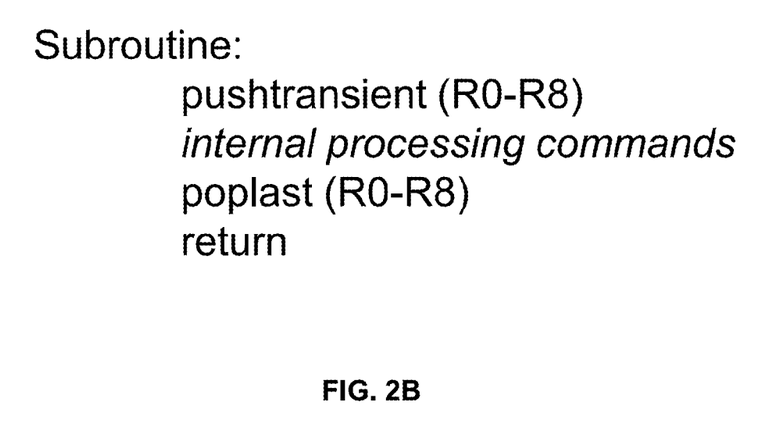

For example, in one embodiment, the software instructions constitute a subroutine and include store commands, load commands, and internal processing commands. FIGS. 2A and 2B illustrate example embodiments of subroutine structures that may be executed by the processing device of FIG. 1. Store commands are loaded into the store logic 120 and are executed by the store logic 120 in cooperation with the store buffer 130. Load commands are loaded into the load logic 140 and are executed by the load logic, possibly in cooperation with the store buffer 130 or some other part of the memory hierarchy. Internal processing commands are loaded into and executed by the execution logic 160.

The store buffer 130 is configured to temporarily store and keep track of data, and is part of the memory hierarchy associated with the processing device 100. For example, the memory hierarchy may include the store buffer 130, the cache memory 150, and an external memory 170 that is external to the processing device 100, in accordance with one embodiment. Data may flow through the memory hierarchy from the store buffer 130, to the cache memory 150, and to the external memory 170 during execution of a subroutine by the processing device 100.

In accordance with one embodiment, the store buffer 130 may comprise multiple structures associated with temporarily storing and keeping track of data. The store logic 120 is operably connected to the store buffer 130 and is configured to accept store commands of the software instructions from the instruction fetch logic 110 and write data to the store buffer 130 in response to executing the store commands in cooperation with the store buffer 130. For example, in one embodiment, the store logic 130 is configured to execute a first command (e.g., a store command) to initiate a sequence of write operations to write data to the plurality of memory devices in the memory hierarchy via propagation of the data sequentially through the memory hierarchy (e.g., from the store buffer 130 all the way out to an external memory device). In another embodiment, the store logic 130 is configured to execute a first command (e.g., a store command) to initiate a sequence of write operations to write data to each memory device of the plurality of memory devices in the memory hierarchy via propagation of the data sequentially through the memory hierarchy (e.g., from the store buffer 130 all the way out to an external memory device).

The load logic 140 is operably connected to the store buffer 130, the cache memory 150, and the execution logic 160. The load logic 140 is configured to accept load commands of the software instructions from the instruction fetch logic 110. The load logic 140 is also configured to execute at least one load command to find the data in the store buffer 130, or in another memory (e.g., cache memory 150) in the memory hierarchy to which the same data has also been written (e.g., propagated from the store buffer 130 to the cache memory 150). In one embodiment, the cache memory 150 is configured to have the data from the store buffer 130 written thereto.

The execution logic 160 is configured to accept software instructions (e.g., internal processing commands) from the instruction fetch logic 110 and execute the software instructions. The load logic 140 is also configured to execute at least one load command, in cooperation with the memory hierarchy, to send the data (e.g., once found in the store buffer 130 or the cache memory 150) to the execution logic 160 to be operated on by the software instructions at the execution logic 160.

Furthermore, the load logic 140 is configured to execute at least one load command in cooperation with the memory hierarchy to indicate to hardware of the processing device 100 that the data in the store buffer (or wherever it currently exists in the memory hierarchy) is no longer needed. Otherwise, the associated store command may be completed by propagating data back through all levels in the memory hierarchy through a sequence of write operations.

For example, when a load command is executed by the load logic 140 in cooperation with the store buffer 130, data in the store buffer is loaded to the execution logic 160. The execution logic 160 may execute the software instructions at the execution logic 160 to operate on the data provided by the load logic 140 from the store buffer 130. However, when the load command is executed, the load command may also tell the hardware of the processing device 100 (e.g., the store buffer 130) that the data is no longer needed.

As a result, the processing device 100 is free to abandon any further writing of the data in the memory hierarchy (e.g., writing to the cache memory 150 or some other memory that is part of the memory hierarchy), thus saving energy. For example, the load logic is configured to execute a command (e.g., a load command) to initiate an interruption of the sequence of write operations by indicating to at least one memory device in the memory hierarchy to terminate the propagation of the data through the memory hierarchy prior to completing the propagation. In one embodiment, the store buffer 130 removes the data from itself in response to the data no longer being needed.

In one embodiment, the store logic 120 is configured to execute at least one store command in cooperation with the store buffer 130 to indicate to hardware of the processing device 100 (e.g., the store buffer 130) that the data loaded into the store buffer 130 is likely to soon no longer be needed (e.g., after the next few clock cycles). This gives notice to the processing device 100 such that the processing device 100 may defer completion of writing of the data in the memory hierarchy (i.e., defer completion of the store). In this manner, the processing device 100 knows not to waste resources, at least not right away, performing further writings in the memory hierarchy. For example, the store logic 120 may be configured to execute a command in cooperation with a first memory device (e.g., the store buffer 130) to indicate to the first memory device to defer the propagation of the data through the memory hierarchy.

Once the data has been loaded from the store buffer 130 to the execution logic 160 in response to a load command, and the internal processing commands have been executed by the execution logic 160, the data may no longer be needed as indicated by the same load command (or by another command executed by the load logic 140). However, if such a load command does not occur, the processing device 100 can proceed to complete the writing of the data in the memory hierarchy (complete the store), but at a deferred time, in accordance with the store command.

In accordance with an alternative embodiment, a separate command such as, for example, an interrupt command may be executed to indicate to the hardware of the apparatus 100 that the apparatus can abandon further writing of the data in the memory hierarchy (i.e. terminate completing of the store). The interrupt command may be executed by the load logic 140, for example, in accordance with one embodiment. However, the interrupt command is uncoupled from any load command that loads data to the execution logic 160.

In accordance with one embodiment, the store buffer 130 is configured to operate in cooperation with a stack (i.e., a last-in-first-out data structure). A store command may be a push command configured to push data onto the stack when the push command is executed by the store logic 120 in cooperation with the store buffer 130. A load command may be a pop command configured to pop data off of the stack (e.g., to the execution logic 160) when the load command is executed by the load logic 140 in cooperation with the store buffer 130.

Referring to FIG. 2A, the example subroutine structure shows a storetransient command, internal processing commands, a loadlast command, and a return command. Similarly, the example subroutine structure of FIG. 2B shows a pushtransient command, internal processing commands, a poplast command, and a return command. A return command simply returns execution from the subroutine to the calling program.

The storetransient command is a command in an instruction set architecture (ISA) that can be fetched by the instruction fetch logic 110 and placed in the store logic 120. When executed by the store logic 120 in cooperation with the store buffer 130, the store transient command stores data into the store buffer 130 (e.g., to registers R0 to R8 in the store buffer). This may be the data shown in FIG. 1 residing in the store buffer 130. The storetransient command also indicates to the hardware of the processing device 100 that the data loaded into the store buffer 130 is likely to soon no longer be needed (e.g., after the next several clock cycles). Again, this gives notice to the processing device 100 such that the processing device 100 may defer completion of writing of (e.g., sequential propagation of) the data in the memory hierarchy.

The pushtransient command is a command in an instruction set architecture (ISA) and is similar to the storetransient command. However, the pushtransient command is used when the store buffer 130 is configured to cooperate with a stack. The pushtransient command is configured to push data through the store buffer 130 and onto the stack.

The loadlast command is a command in an instruction set architecture (ISA) that can be fetched by the instruction fetch logic 110 and placed in the load logic 140. When executed by the load logic 140 in cooperation with the memory hierarchy, the loadlast command finds the data (e.g., in registers RO to R8 of the store buffer 130) and loads the data to the execution logic 160. The loadlast command also indicates to the hardware of the processing device 100 that the data in the store buffer (or wherever it currently exists in the memory hierarchy) is no longer needed. Again, this lets the processing device 100 know that the processing device 100 may abandon or terminate any further writing of (e.g., sequential propagation of) the data in the memory hierarchy.

The poplast command is similar to the loadlast command. However, the poplast command is used when the store buffer 130 is configured to cooperate with a stack. The poplast command is configured to pop data off of the stack to, for example, the execution logic 160.

Again, in accordance with one embodiment, the internal processing commands may be software instructions that are executed by the execution logic 160 to operate on the data provided by the load logic 140 from, for example, the store buffer 130.

Figure 3:
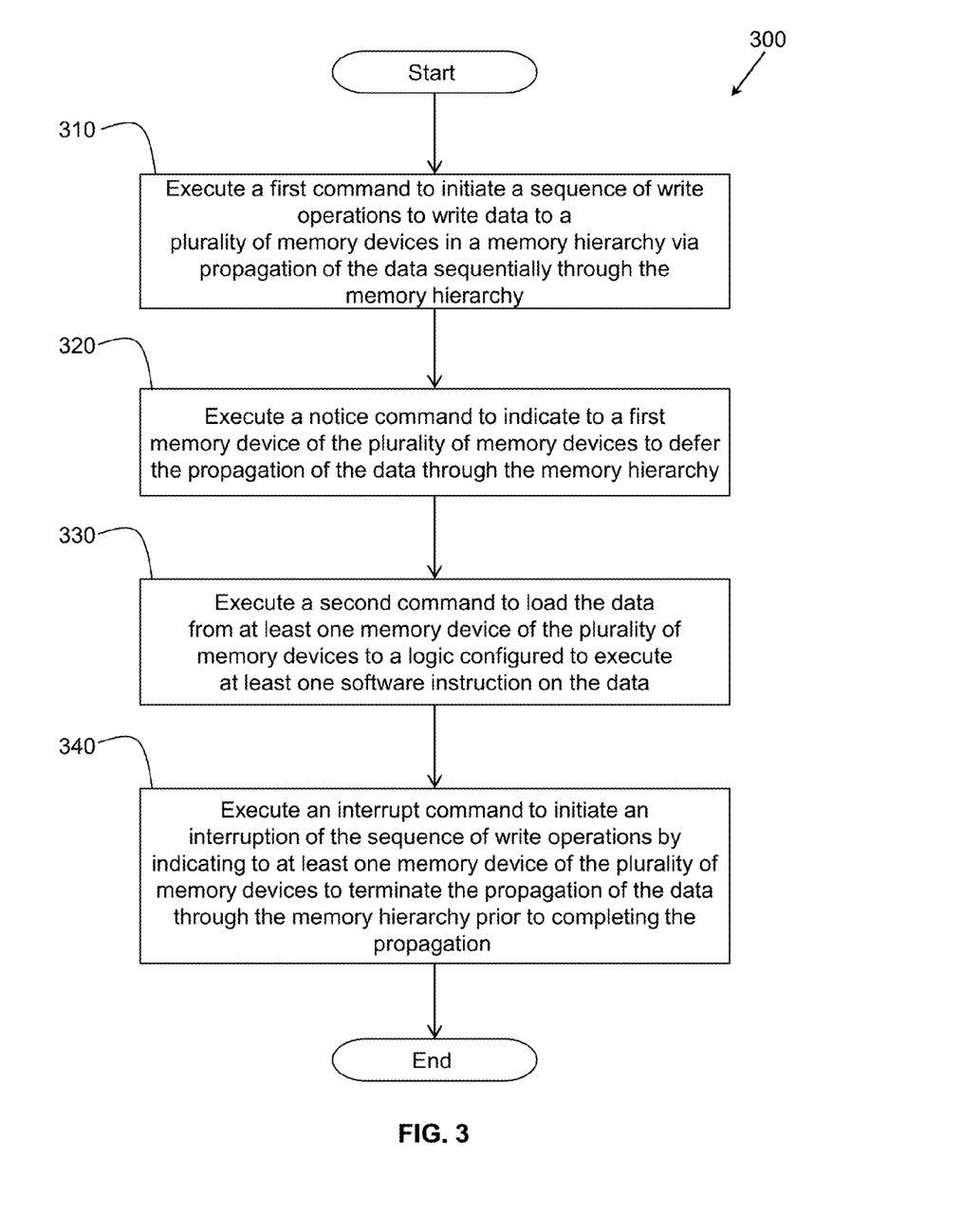
FIG. 3 illustrates an example embodiment of a method for limiting the writing of data in a memory hierarchy using the processing device of FIG. 1.

FIG. 3 illustrates an example embodiment of a method 300 for limiting the writing of data in a memory hierarchy using the processing device 100 of FIG. 1. Method 300 is implemented to be performed by the processing device 100 of FIG. 1, or by a computing device (e.g., an integrated circuit device) configured with an algorithm of method 300. Method 300 will be described from the perspective that the processing device (or the computing device) has hardware configured to execute software commands. Method 300 will also be described from the perspective that, during a processing operation performed by the processing device (or the computing device), data can propagate through a memory hierarchy. That is, the same data can be successively written to sequential parts in the memory hierarchy as part of completing a data store operation.

Method 300 starts when, for example, a software subroutine is executed on the processing device 100. Upon initiating method 300 at 310, a first command is executed to initiate a sequence of write operations (e.g., a store operation) to write data to a plurality of memory devices in a memory hierarchy (e.g., in one embodiment, initiate writing data to each memory device of a plurality of memory devices). The data is propagated sequentially through the memory hierarchy by way of the sequence of write operations. In one embodiment, the first command may be a store command loaded from the instruction fetch logic 110 into the store logic 120 and executed by the store logic 120 in cooperation with the store buffer 130. The memory hierarchy may have memory devices both within the processing device 100 (e.g., store buffer 130 and cache memory 150) and external to the processing device 100 (e.g., see the external memory of FIG. 4).

At 320, a notice command is executed to indicate to the first memory device to defer the propagation of the data through the memory hierarchy. For example, the first command may be a store command that is executed by the store logic 120 simply to initiate the sequence of write operations. The notice command may also be executed by the store logic 120 to give notice to the processing device 100 (e.g., to the store buffer 130) that the processing device 100 may defer completion of writing of the data in the memory hierarchy as discussed above herein. In one embodiment, the first command and the notice command may be combined into a single command (e.g., a storetransient command) executed to both initiate the sequence of write operations and provide the indication to the processing device to defer propagation of the data.

At 330, a second command is executed to load the data from a memory device of the plurality of memory devices to a logic configured to execute at least one software instruction on the data. For example, in one embodiment, the second command may be a load command loaded from the instruction fetch logic 110 into the load logic 140 and executed by the load logic 140 in cooperation with the store buffer 130 or the cache memory 150. Execution of the load command may result in the data being found in, for example, the store buffer 130 or the cache memory 150 and loaded into the execution logic 160.

At 340, an interrupt command is executed to interrupt the sequence of write operations and terminate the propagation of the data through the memory hierarchy before the propagation is complete. For example, the second command may be a load command that is executed by the load logic 140 simply to find the data and load the data into the execution logic 160. The interrupt command may also be executed by the load logic 140 to tell the processing device 100 (e.g., the store buffer 130 or the cache memory 150) that the writing of the data in the memory hierarchy is to be terminated as discussed above herein. In one embodiment, the second command and the interrupt command may be combined into a single command (e.g., a loadlast command) executed to both load the data to the execution logic 160 and terminate any further propagation of the data through the memory hierarchy.

In this manner, unnecessary writing of data to the memory hierarchy can be avoided to save energy. This provides for a more efficient use of the resources of the processing device and any external memory of the memory hierarchy.

In one embodiment, the data may be propagated from the store buffer 130 of the memory hierarchy to the cache memory 150 of the memory hierarchy before the loadlast command or the interrupt command, which makes the indication to the hardware of the processing device that the data is no longer needed, is executed. Furthermore, the data may then be written to another memory (e.g., an external memory) in the memory hierarchy from the cache memory before the loadlast command or the interrupt command is executed. The further the data makes it through the memory hierarchy before propagation is terminated, the more energy is consumed by the processing device 100.

In accordance with one embodiment, a first memory device (e.g., the store buffer 130) of the memory hierarchy may be configured to operate in cooperation with a stack. A store command may be a push command (e.g., a pushtransient command) configured to push data onto the stack. A load command may be a pop command (e.g., a poplast command) configured to pop data off of the stack.

System-on-Chip (SOC) Embodiment

Figure 4:
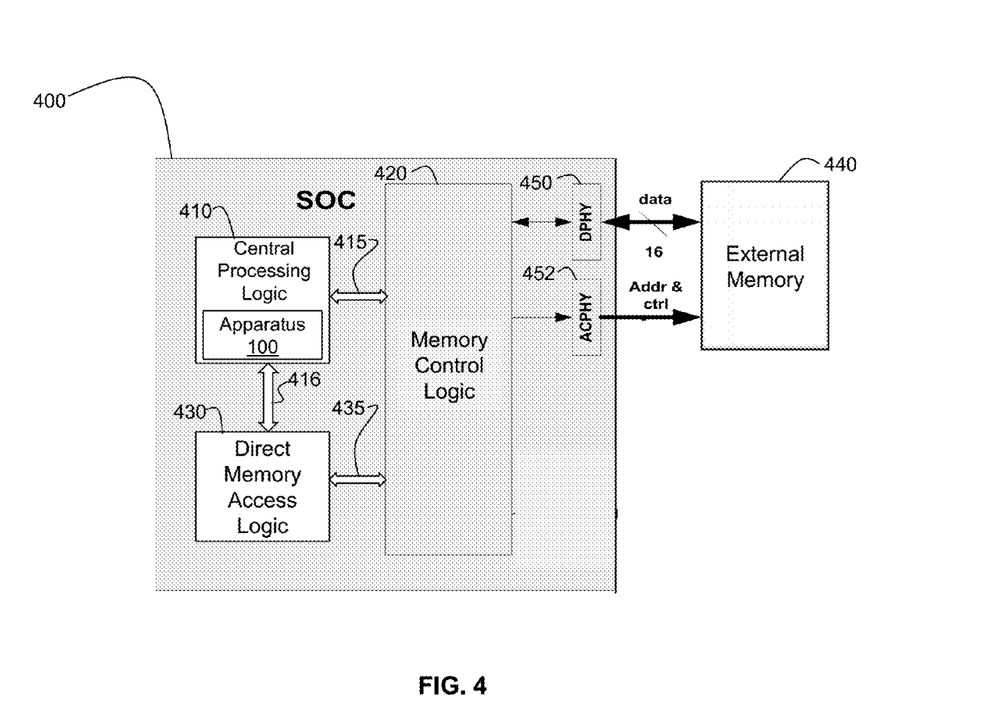
FIG. 4 illustrates an example embodiment of a system-on-chip (SOC) configuration having the processing device of FIG. 1 configured as a central processing logic.

FIG. 4 illustrates an example embodiment of a system-on-chip (SOC) configuration 400 having the processing device 100 of FIG. 1 configured as part of a central processing logic 410. FIG. 4 shows an implementation of the processing device 100 in a larger context. The SOC configuration 400 includes central processing logic 410, memory control logic 420, and direct memory access logic 430. In one embodiment, the central processing logic 410 includes the processing device 100 and additional elements that allow the central processing logic 410 to fully function as a central processing unit (CPU) in a computer system.

FIG. 4 also shows external memory 440 (e.g., DRAM) operably connected to the SOC configuration 400. External memory 440 is external to the processing device 100 and the SOC configuration 400 but is, however, a part of the memory hierarchy just as the store buffer 130 and the cache memory 150 are part of the memory hierarchy. For example, external memory 440 may be one memory device of the additional memory devices 170 in the memory hierarchy. Memory control logic 420 is configured to facilitate access of external memory 440.

The central processing logic 410 is operably connected to the memory control logic 420 and is configured to provide commands to the memory control logic 420 via a communication bus 415. Direct memory access logic 430 is operably connected to memory control logic 420 via a communication bus 435 and to central processing logic 410 via a communication bus 416. Direct memory access logic 430 is configured to access external memory 440 via the communication bus 435.

The SOC configuration 400 of FIG. 1 also includes a data physical layer (DPHY) 450 and an address/control physical layer (ACPHY) 452. The DPHY 450 provides a data interface (e.g., a 16-bit data interface) between the SOC configuration 400 and the external memory 440. The ACPHY provides an address and control signal interface between the SOC configuration 400 and the external memory 440.

In this manner, the processing device 100 may be implemented into a larger system configuration which extends the memory hierarchy beyond the processing device 100 and beyond the SOC configuration 400. However, the store and load commands executed by the processing device 100 may affect writing of data throughout the memory hierarchy (e.g., from the store buffer 130 to the external memory 440).

Computing Device Embodiment

Figure 5:
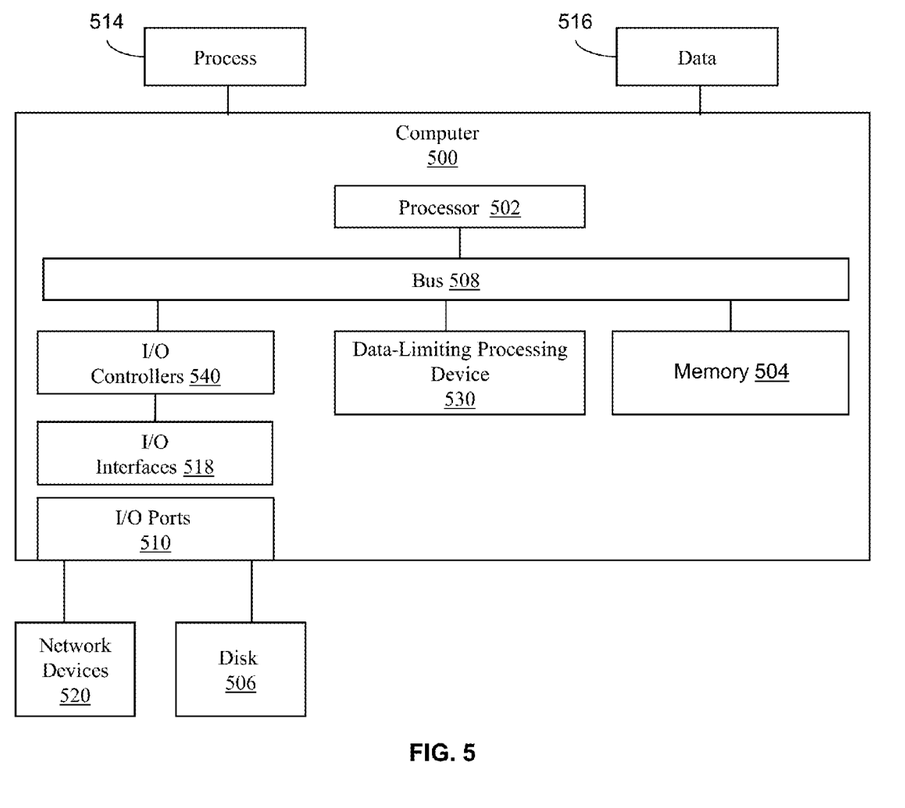
FIG. 5 illustrates an example embodiment of a computing device that is configured and/or programmed with one or more of the example devices and methods described herein, and/or equivalents.

FIG. 5 illustrates an example embodiment of a computing device that is configured and/or programmed with one or more of the example devices and methods described herein, and/or equivalents. The example computing device may be a computer 500 that includes a processor 502, a memory 504, and input/output ports 510 operably connected by a bus 508. In one example, the computer 500 may include a data-limiting processing device 530 configured to execute one or more of a store command or a load command, similar to data-limiting processing device 100 shown in FIG. 1. The store command may indicate to the hardware of the processing device 530 that data loaded into a store buffer may soon no longer be needed. The load command may indicate to the hardware of the processing device 530 that data loaded into the store buffer is no longer needed. In different examples, the device 530 may be implemented in hardware, a non-transitory computer-readable medium with stored instructions, firmware, and/or combinations thereof. While the device 530 is illustrated as a hardware component attached to the bus 508, it is to be appreciated that in one example, the functionality of the device 530 could be implemented in the processor 502.

In one embodiment, device 530 or the computer is a means (e.g., structure: hardware, non-transitory computer-readable medium, firmware) for performing the actions described. In some embodiments, the computing device may be one or more integrated circuits. The means may be implemented, for example, as an ASIC programmed to perform data limiting to a memory hierarchy, where writing of the data to the memory hierarchy is ceased when the data is no longer needed. In other embodiments, the computing device may be a server operating in a cloud computing system, a server configured in a Software as a Service (SaaS) architecture, a smart phone, laptop, tablet computing device, and so on). The means may also be implemented as stored computer executable instructions that are presented to computer 500 as data 516 that are temporarily stored in memory 504 and then executed by processor 502.

Device 530 may also provide means (e.g., hardware, non-transitory computer-readable medium that stores executable instructions, firmware) for performing data-limiting to a memory hierarchy.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

Integrated Circuit Device Embodiment

Figure 6:
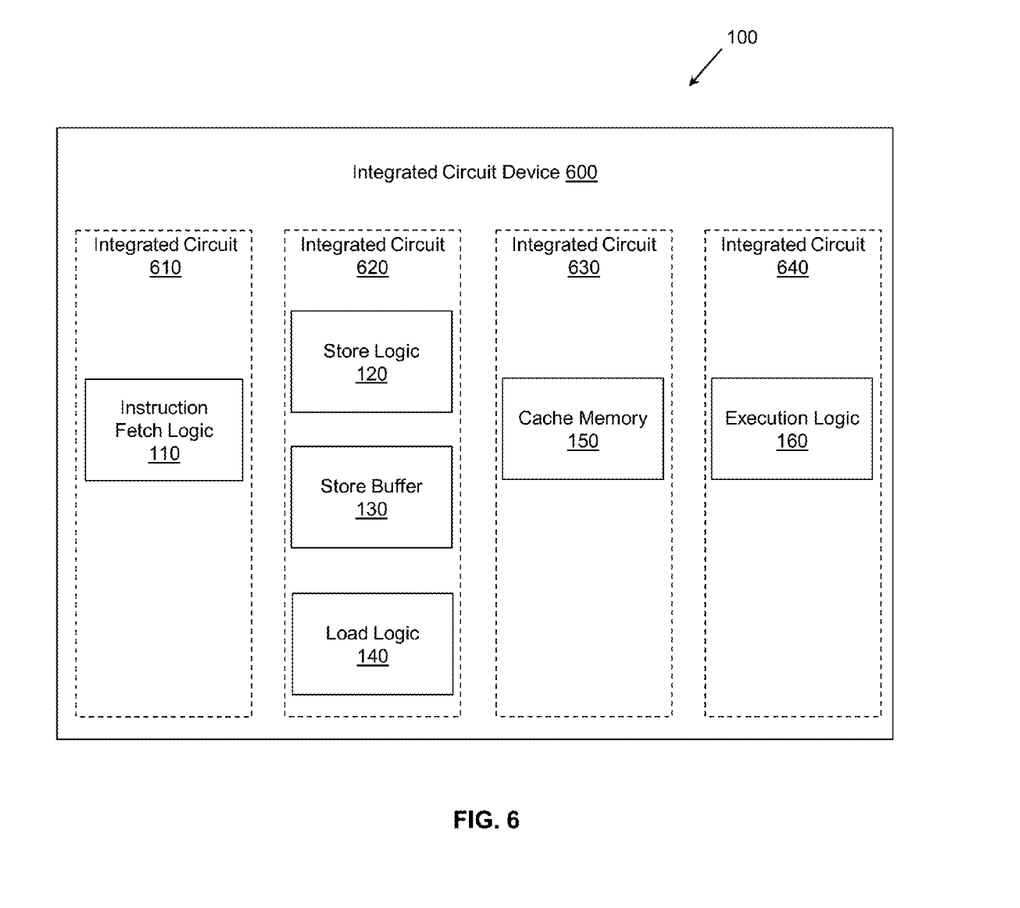
FIG. 6 illustrates one example embodiment of the processing device of FIG. 1 implemented as an integrated circuit device and providing limiting of writing of data in a memory hierarchy.

In one embodiment, the computing device may be the data-limiting processing device 100 on one or more integrated circuit chips. FIG. 6 illustrates one example embodiment of the processing device 100 of FIG. 1 implemented as an integrated circuit device 600 and providing limiting of writing of data in a memory hierarchy. In this embodiment, the instruction fetch logic 110 is embodied as a separate integrated circuit 610. Also, store logic 120, store buffer 130, and load logic 140 are embodied on an individual integrated circuit 620. Furthermore, cache memory 150 is embodied as a separate integrated circuit 630, and execution logic 160 is embodied as a separate integrated circuit 640.

The circuits are connected via connection paths to communicate signals. While integrated circuits 610, 620, 630, and 640 are illustrated as separate integrated circuits, they may be integrated into a common integrated circuit device 600. Additionally, integrated circuits 610, 620, 630, and 640 may be combined into fewer integrated circuits or divided into more integrated circuits than illustrated.

In another embodiment, the instruction fetch logic 110, the store logic 120, the store buffer 130, the load logic 140, the cache memory 150, and the execution logic 160 (which are illustrated in integrated circuits 610, 620, 630, and 640, respectively) may be combined into a separate application-specific integrated circuit. In other embodiments, portions of the functionality associated with the instruction fetch logic 110, the store logic 120, the store buffer 130, the load logic 140, the cache memory 150, and the execution logic 160 may be embodied as firmware executable by a processor and stored in a non-transitory memory (e.g., a non-transitory computer storage medium).

Systems, methods, and other embodiments associated with providing limited writing in a memory hierarchy have been described. According to one embodiment, a method includes executing a first command on a processing device. The first command initiates a sequence of write operations to write data to a plurality of memory devices sequentially configured in a memory hierarchy via propagation of the data sequentially through the memory hierarchy. The method also includes executing a second command on the processing device. The second command initiates an interruption of the sequence of write operations by indicating to at least one memory device of the plurality of memory devices to terminate the propagation of the data through the memory hierarchy prior to completing the propagation. This allows the processing device to abandon further writing of the data in the memory hierarchy to save energy.

DEFINITIONS AND OTHER EMBODIMENTS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

"Operable interaction", as used herein, refers to the logical or communicative cooperation between two or more logics via an operable connection to accomplish a function.

ASIC: application specific integrated circuit.
CD: compact disk.
CD-R: CD recordable.
CD-RW: CD rewriteable.

DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

What is claimed is:

1. An apparatus comprising:
   a plurality of memory devices sequentially connected in a memory hierarchy;
   a first logic configured to execute a first command to initiate a sequence of write operations to write data to the plurality of memory devices in the memory hierarchy, wherein the sequence of write operations propagate a copy of the data sequentially through the memory hierarchy and successively store the copy of the data in multiple memory devices of the plurality of memory devices; and
   a second logic configured to execute a second command to initiate an interruption of the sequence of write operations by indicating to at least one memory device of the plurality of memory devices to terminate the propagation of the copy of the data through the memory hierarchy prior to completing the sequence of write operations.

2. The apparatus of claim 1, wherein a first memory device of the plurality of memory devices in the memory hierarchy comprises a store buffer.

3. The apparatus of claim 2, wherein a second memory device of the plurality of memory devices in the memory hierarchy comprises a cache memory device, wherein the cache memory device is configured to receive the copy of the data being propagated through the memory hierarchy from the store buffer.

4. The apparatus of claim 1, wherein a first memory device of the plurality of memory devices in the memory hierarchy is configured to, in response to the first command comprising a push command, operate in cooperation with a stack to push the data onto the stack.

5. The apparatus of claim 4, wherein the first memory device of the plurality of memory devices in the memory hierarchy is configured to, in response to the second command comprising a pop command, operate in cooperation with the stack to pop the data off of the stack.

6. The apparatus of claim 1, wherein the first logic is configured to execute the first command in cooperation with a first memory device of the plurality of memory devices to indicate to the first memory device to defer the propagation of the copy of the data through the memory hierarchy.

7. The apparatus of claim 1, further comprising third logic configured to execute at least one software instruction.

8. The apparatus of claim 7, wherein the second logic is configured to execute the second command, in cooperation with the at least one memory device, to find the copy of the data.

9. The apparatus of claim 8, wherein the second logic is configured to execute the second command, in cooperation with the at least one memory device, to send the copy of the data to the third logic to be operated on by the at least one software instruction.

10. The apparatus of claim 1, wherein the apparatus is configured as a system-on-chip device, and wherein the system-on-chip device further comprises:
    central processing logic;
    memory control logic configured to facilitate access of an external memory device that is external to the apparatus, wherein the external memory device is part of the memory hierarchy, and wherein the central processing logic is operably connected to the memory control logic and is configured to provide commands to the memory control logic via a first communication bus; and
    direct memory access logic, operably connected to the memory control logic and the central processing logic, configured to access the external memory device via a second communication bus.

11. A method comprising:
    in a processing device having hardware configured to execute software commands:
    executing a first command to initiate a sequence of write operations to write data to a plurality of memory devices sequentially connected in a memory hierarchy, wherein the sequence of write operations propagate a copy of the data sequentially through the memory hierarchy and successively store the copy of the data in multiple memory devices of the plurality of memory devices; and executing a second command to initiate an interruption of the sequence of write operations by indicating to at least one memory device of the plurality of memory devices to terminate the propagation of the copy of the data through the memory hierarchy prior to completing the sequence of write operations.

12. The method of claim 11, wherein the executing of the first command indicates to a first memory device of the plurality of memory devices to defer the propagation of the copy of the data through the memory hierarchy.

13. The method of claim 11, wherein the first command comprises a push command configured to push the copy of the data from a first memory device of the plurality of memory devices onto a stack.

14. The method of claim 13, wherein the second command comprises a pop command configured to pop the copy of the data off of the stack.

15. The method of claim 11, further comprising draining the data from a first memory device of the plurality of memory devices in the memory hierarchy to a second memory device of the plurality of memory devices in the memory hierarchy before executing the second command that initiates the interruption of the sequence of write operations.

16. An integrated circuit device, comprising:
a plurality of memory devices sequentially configured in a memory hierarchy;
execution logic configured to execute software instructions;
store logic configured to execute a store command to initiate a sequence of write operations to write data to the plurality of memory devices, wherein the sequence of write operations propagate a copy of the data sequentially through the memory hierarchy and successively store the copy of the data in multiple memory devices of the plurality of memory devices; and
load logic configured to execute a load command to:
  (i) load the copy of the data into the execution logic from one memory device of the plurality of memory devices, and
  (ii) initiate an interruption of the sequence of write operations by indicating to the one memory device to terminate the propagation of the copy of the data through the memory hierarchy prior to completing the sequence of write operations.

17. The integrated circuit device of claim 16, further comprising an instruction fetch logic configured to fetch the store command and the load command from a set of software instructions that are accessible to the integrated circuit device.

18. The integrated circuit device of claim 16, wherein the store logic is configured to execute the store command in cooperation with a store buffer of the plurality of memory devices to indicate to the store buffer to defer the propagation of the copy of the data through the memory hierarchy.

19. The integrated circuit device of claim 18, wherein the store buffer is configured to, in response to the store command which includes a push command, operate in cooperation with a stack to push the copy of the data onto the stack.

20. The integrated circuit device of claim 19, wherein the store buffer is configured to, in response to the load command which comprises a pop command, operate in cooperation with the stack to pop the copy of the data off of the stack.

* * * * *